United States Patent
Van Erlach (10) Patent No.: US 10,198,756 B2
(45) Date of Patent: Feb. 5, 2019

(54) DYNAMIC REPRICING OF AN ONLINE SUBSCRIPTION

(71) Applicant: Julian Van Erlach, St. James, NY (US)

(72) Inventor: Julian Van Erlach, St. James, NY (US)

( * ) Notice: Subject to any disclaimer, the term of this patent is extended or adjusted under 35 U.S.C. 154(b) by 0 days.

(21) Appl. No.: 15/844,742

(22) Filed: Dec. 18, 2017

(65) Prior Publication Data

US 2018/0276724 A1    Sep. 27, 2018

(51) Int. Cl.
*G06Q 30/02* (2012.01)

(52) U.S. Cl.
CPC ................ *G06Q 30/0283* (2013.01)

(58) Field of Classification Search
None
See application file for complete search history.

(56) References Cited

U.S. PATENT DOCUMENTS

| | | | |
|---|---|---|---|
| 8,095,444 B2* | 1/2012 | Van Erlach | G06Q 40/00 705/35 |
| 8,140,381 B1 | 3/2012 | Wu et al. | |
| 8,140,402 B1* | 3/2012 | Mesaros | G06Q 30/0222 705/26.1 |
| 8,463,639 B2 | 6/2013 | Davis et al. | |
| 8,615,422 B1 | 12/2013 | Alkasimi et al. | |
| 9,684,914 B1 | 6/2017 | Porter et al. | |
| 9,697,531 B1 | 7/2017 | Bourget | |
| 2003/0023500 A1 | 1/2003 | Boies et al. | |
| 2010/0205030 A1 | 8/2010 | Gilreath | |
| 2012/0084121 A1 | 4/2012 | Campbell | |
| 2012/0101886 A1* | 4/2012 | Subramanian | G06Q 30/0222 705/14.23 |
| 2014/0156438 A1 | 6/2014 | Beavers | |
| 2014/0322678 A1* | 10/2014 | Briancon | G09B 19/0092 434/127 |

(Continued)

FOREIGN PATENT DOCUMENTS

GB    2527414    12/2015

OTHER PUBLICATIONS

Kephart, Jeffrey O., James E. Hanson, and Amy R. Greenwald. "Dynamic pricing by software agents." Computer Networks 32.6 (2000): 731-752.

(Continued)

*Primary Examiner* — Thomas L Mansfield (57) ABSTRACT

A method and associated e-commerce system for dynamically repricing an online subscription automatically identify a competing offer that offers a product that is equivalent to a subscribed product. If the competing offer offers a quantity of the equivalent product that is different from a quantity specified by the subscription, or if the competing offer is effective during a period of time that differs from a replenishment period of the subscription, the system automatically reconciles the differences and compares the resulting unit cost of the subscription product to the unit cost of the competing offer product. The system then determines whether it would be more beneficial to the subscriber to reprice a certain number of units of the subscription or to reprice the subscription for a certain period of time, and raises or lowers the price of the subscription accordingly as a function of this determination.

21 Claims, 2 Drawing Sheets

(56) References Cited

U.S. PATENT DOCUMENTS

2015/0051955 A1 2/2015 Kumar et al.
2015/0088535 A1 3/2015 Smith et al.
2015/0278859 A1* 10/2015 Sundaresan ........ G06Q 30/0255
    705/14.53
2016/0267509 A1 9/2016 Grosso
2017/0303111 A1* 10/2017 Kohli ................. G06Q 20/3224

OTHER PUBLICATIONS

Elmaghraby, Wedad, and Pinar Keskinocak. "Dynamic pricing in the presence of inventory considerations: Research overview, current practices, and future directions." Management science 49.10 (2003): 1287-1309.
Dimicco, Joan Morris, Pattie Maes, and Amy Greenwald. "Learning curve: A simulation-based approach to dynamic pricing." Electronic Commerce Research 3.3-4 (2003): 245-276.
Mihailescu, Marian, and Yong Meng Teo. "Dynamic resource pricing on federated clouds." Proceedings of the 2010 10th IEEE/ACM International Conference on Cluster, Cloud and Grid Computing. IEEE Computer Society, 2010.

* cited by examiner

DYNAMIC REPRICING OF AN ONLINE SUBSCRIPTION

BACKGROUND

The present invention relates in general to e-commerce systems and in particular to dynamic repricing of online subscription services.

Online merchants may sell goods and services by means of an online subscription. Such methods automatically deliver a predetermined "replenishment" quantity of units of a good or service during each "replenishment" period throughout a fixed term of the subscription.

For example, if a merchant offers to sell a vitamin pill by subscription, a subscribing customer might automatically receive a bottle of thirty two-pill "servings" of the vitamin on the first day of each monthly replenishment period of a twelve-month subscription term. The subscription would automatically transfer a payment or invoice a subscriber each month for a corresponding 60-pill replenishment.

A unit price for this subscription may be determined by any known means. For example, if a "unit" is defined as a single serving, an automatic $30 "replenishment" billing at the beginning of each one-month replenishment period would result in a $1.00/serving unit price. But defining a unit as a single bottle would result in a $30 unit cost, and as a single pill would produce a $0.50 unit cost.

An online merchant may permit a subscribing customer to cancel a subscription at any time. This, however, creates a risk of a prematurely terminated subscription any time that a subscriber finds a lower price during the term of the subscription. A merchant's ability to competitively reprice a subscription mid-term is thus an important method of preventing churn.

Existing computerized e-commerce subscription systems have limited repricing features that at most merely notify a subscriber that a price of a current subscription has been lowered to match that of a competing price. This competing price may comprise a combination of events like a drop in a wholesale price, a manufacturer promotion, a competing merchant's announcement of a lower-priced offer, or a new promotion by the merchant offering the current subscription.

Existing e-commerce systems suffer, however, from an inability to compare prices when a potentially competing offer does not offer exactly the same product as the subscribed product, offers a product in a different quantity, comprises multiple products or sales incentives, or comprises a subscription that specifies a different replenishment period, a different term, or a different replenishment cost.

For example, known e-commerce systems cannot determine that a one-week third-party promotion that offers 200 servings of a product for $35 is a better bargain than a $20/month subscription that provides 100 servings/month. Similarly, such systems could not determine that an offer to sell a bottle of 100 1000 mg brand-name supplements for $10 is a better choice than a bottle of 50 generic 500 mg supplements for $3.

This technical problem of known e-commerce systems is detrimental to online merchants because the problem prevents the systems from automatically repricing a current subscription when a competing offer specifies a product that is equivalent to, rather than identical to, a subscribed product, includes incentives or other products not comprised by a subscription, or that offers a product in a different quantity or different serving size than that of the subscription. These problems exist even when a competing offer is a subscription that comprises a replenishment period, serving size, or replenishment amount that differs from that of the current subscription.

This technical limitation thus reduces the ability of e-commerce systems to avoid premature termination of a subscription by dynamically repricing the subscription in response to a competing offer.

SUMMARY

An embodiment of the present invention provides a method for determining unit-cost pricing of an online subscription, the method comprising:

identifying, by a processor, an alternative offering that offers to sell an alternative quantity of a subscribed item, where an online merchant is currently providing the subscribed item to a subscriber by means of an online subscription, where the online subscription provides to the subscriber a subscribed quantity of the subscribed item, at a current subscription unit price, during each subscription replenishment period comprised by a subscription term, and where the alternative offering offers to provide an alternative quantity of the subscribed item at an alternative unit price during an alternative time span comparing, by the processor the alternative unit price to the current subscription unit price;

selecting, by the processor, an updated unit price of the subscribed item as a function of the comparing; and setting, by the processor, a subscription-reorder price of the online subscription during a reorder term of the online subscription as a function of the updated unit price.

Another embodiment of the present invention provides a computer program product, comprising a computer-readable hardware storage device having a computer-readable program code stored therein, said program code configured to be executed by one or more processors of a computer system to implement a method for determining unit-cost pricing of an online subscription, the method comprising:

identifying, by the processor, an alternative offering that offers to sell an alternative quantity of a subscribed item, where an online merchant is currently providing the subscribed item to a subscriber by means of an online subscription, where the online subscription provides to the subscriber a subscribed quantity of the subscribed item, at a current subscription unit price, during each subscription replenishment period comprised by a subscription term, and where the alternative offering offers to provide an alternative quantity of the subscribed item at an alternative unit price during an alternative time span comparing, by the processor the alternative unit price to the current subscription unit price;

selecting, by the processor, an updated unit price of the subscribed item as a function of the comparing, where the comparing and the selecting compensate for a difference between the subscribed quantity and the alternative quantity; and setting, by the processor, a subscription-reorder price of the online subscription during a reorder term of the online subscription as a function of the updated unit price.

Yet another embodiment of the present invention provides a computer system comprising a processor, a memory coupled to the processor, and a computer-readable hardware storage device coupled to the processor, the storage device containing program code configured to be run by the processor via the memory to implement a method for determining unit-cost pricing of an online subscription, the method comprising:

identifying, by the processor, an alternative offering that offers to sell an alternative quantity of a subscribed item, where an online merchant is currently providing the subscribed item to a subscriber by means of an online subscription, where the online subscription provides to the subscriber a subscribed quantity of the subscribed item, at a current subscription unit price, during each subscription replenishment period comprised by a subscription term, and where the alternative offering offers to provide an alternative quantity of the subscribed item at an alternative unit price during an alternative time span comparing, by the processor the alternative unit price to the current subscription unit price;

selecting, by the processor, an updated unit price of the subscribed item as a function of the comparing, where the comparing and the selecting compensate for a difference between the subscribed quantity and the alternative quantity; and setting, by the processor, a subscription-reorder price of the online subscription during a reorder term of the online subscription as a function of the updated unit price.

DETAILED DESCRIPTION

Online subscribers can search for better prices at any time during the term of an online subscription and, if discovering a better offer, may prematurely cancel a higher-priced subscription. An online merchant may use e-commerce software to identify certain competing offers and respond with a counter-offer that allows a subscriber to reprice a subscription midstream.

Known e-commerce systems, however, suffer from technical limitations that prevent merchants from identifying and responding to certain competing offers, including offers that may be offered by a brick-and-mortar or online competitor, or by the merchant itself. For example, pricing-optimization components of known e-commerce systems may be able to price-match a current subscription against a competing offer only when the competing offer offers an identical product, offers a quantity identical to that of the replenishment quantity quantities, or offers a product during a certain period of time. If a competing offer offers a product that is merely similar to, or a generic version of, a subscribed product, if a competing offer offers a quantity of a product that differs from a subscription's replenishment quantity, or if a competing offer is effective during only a period of time that does not correspond in a straightforward manner to a subscription's replenishment period, the e-commerce system may not identify the competing offer in time to respond.

The present invention provides a technical solution to this technical problem by enhancing an e-commerce system to reprice reorders and subscriptions in response to competing offers with greater flexibility. This solution allows the system to compare a subscription's per-unit, period-based pricing with a competitive pricing format, where either format may comprise landed sales prices; prices based on different or multiple units, unit costs, or serving sizes; terms that include incentives, free offers, or free products; or heterogeneous pricing, such as an offering that includes multiple dental, bookkeeping, warranty, or streaming-media services. Embodiments of the present invention resolve any such differences in order to allow real-time price comparisons based on similar per-unit costing standards.

For example, a subscribing customer may place a standing order with a merchant for a 30-tablet bottle of vitamin D with an automatic monthly replenishment. If the same, or another, merchant subsequently offers a 30-tablet bottle of a comparable vitamin, a buy-one-get-one-free offer for any quantity of a comparable vitamin, or a 60-tablet bottle of a comparable vitamin, the subsequent offer may offer the vitamin at a lower per-pill price than the subscription. In such a case, the present invention may automatically reprice the subscription's per-pill price to provide value no less than that of the competing offer.

The repricing may revise the total price of the subscription either higher or lower or may revise the per-unit price of the subscription either higher or lower. But in all cases, the new price is selected as a function of the unit pricing of the competing offer. In some cases, the repricing may add to the subscription or delete from the subscription promotional items, such as a free gift, a coupon, a rebate, or a discount on a further purchase of a product or service.

These functions of the present invention can be extended to any sort of per-unit pricing, whether that unit is a unit of weight, a unit of liquid, an episode of a streaming television show, a box of cereal, or a six-pack of men's socks. The present invention may also be applied to any known type of product or service, such as prescription drugs, household items, dental cleanings, garden supplies, produce, telecommunications services, online gaming accounts, building materials, or eye exams. It may also be applied to individual elements of complex products or services that comprise distinct actions, components, tasks, or subsystems.

Embodiments of the present invention may be concurrently applied to multiple subscribed items, or to items ordered by multiple customers. Such embodiments may comprise multiple repricing operations or may be used to determine an aggregate price that is not a result of repricing every item in a subscription.

Embodiments may also be tailored or weighted to select different prices as a function of customer characteristics, such as purchase history, activity history, shipping address, salary history, credit score, or payment method.

The present invention further solves technical limitations of existing e-commerce systems by accounting for cases where a competing offer and the original subscription do not offer the same number of units during a similar duration of time.

For example, a subscription may automatically provide monthly 30-ounce supplies of a sports supplement for a monthly replenishment price of $9.99, or a $0.33/ounce unit cost. A competing offer may offer the same number of units of the same item at a lower price during the current month. But another competing offer may offer a different number of servings of a similar (but not identical) product at a $0.28/serving during only a part of the current subscription period.

In the latter case, an embodiment of the present invention may automatically associate the subscribed item with one or more parameters that allow the embodiment to compare pricing of the subscribed item to pricing of non-identical products in the same product class. For example, if the subscribed item comprises a Brand A of whey protein powder and the competing non-identical product comprises a Brand B of whey protein powder, the embodiment might determine that the Brand B item qualifies for comparison because the Brand B item is in the same product class as the subscribed item. The embodiment might then automatically reprice the subscribed Brand A item to match the $0.28/serving unit price of the of the Brand B item.

In a further improvement over known e-commerce systems, if the Brand B offer is offered only during the last two weeks of the current replenishment period, the embodiment might reprice the subscription to match or beat the $0.28/serving price only during those last two weeks of the current period.

In another example, a competing offer might offer a buy-one-get-one-free offer for a 60-day jug of a non-identical product of the same class as the subscribed product, and this order might be valid only during the third week of the current subscription's next replenishment period.

If this competing buy-one-get-one-free offer offers two 60-day supplies at a price that corresponds to a unit price of $0.27/serving, an embodiment of the present invention might respond to a detection of the competing offer by automatically discounting the next monthly replenishment of the current subscription. This discount would reduce the per-unit price of one week of that month's replenishment quantity to a price equivalent to the competing $0.27/serving price.

Embodiments, when determining a scope of a repricing action, may match a quantity of a competing offer or a duration of a competing offer. For example, if the buy-one-get-one-free offer offers a total of 120 daily servings, the original 30 serving/month subscription might be repriced to a competing per-unit cost for four months—thereby matching the number of servings discounted by the competing offer. In another case, however, if a buy-one-get-one-free offer is effective only during two weeks of the subscription's next monthly replenishment period, then an embodiment might reprice the current subscription to match the competing per-unit cost only during those two weeks.

Embodiments may be configured to automatically provide these and other types of intelligent comparisons and adjustments, or may automatically provide such adjustments only when allowed by certain predefined guidelines. For example, an embodiment may reprice a subscription only when a competing offer specifies a unit price that is at least 5% lower than the current subscription's unit price.

Other embodiments may not automatically reprice subscriptions, instead requiring confirmation from a subscribing customer before repricing a subscription. An embodiment may allow a subscriber to select a repricing option from several alternatives that may differ in quantities, total cost, or whether the repricing includes incentives like a free gift or incentive points. Some embodiments may also, either before or after repricing, explain to users a reason for a repricing action, an amount of savings provided by a repricing action, or a method by which a new price has been determined. In all cases, old, new, or competing prices may be expressed as total amounts or in any units desired by an implementer.

Some embodiments may be configured to reprice only upcoming replenishment periods by varying the amount of upcoming replenishment payment. But other embodiments may dynamically adjust a subscription cost at any time in response to newly detected competing offers. In this latter case, a customer may receive a partial refund of a previously paid replenishment payment or may receive a partial credit of the previously paid replenishment payment that may be applied to the next period's payment. Some embodiments, when notifying a customer of an availability of a repricing, may allow the customer to choose whether to immediately receive a refund or credit, to immediately reprice the subscription during the current replenishment period, or to defer a repricing discount until the next replenishment payment is due.

Some embodiments may reprice a subscription's per-unit cost as a function of a lowest competing offer, of all known competing offers, of an average of all competing offers, of one or more competing offers that satisfy certain criteria related to a duration, start time, or offered quantity of the offer, or of some other function of one or more competing offers.

In some cases, a repricing action may raise a per-unit cost of an existing subscription. This may occur, for example, when a competing offer, a highest competing offer, an average of all competing offers, or some other function of one or more competing offers identifies a per-unit price higher than that of the current per-unit price of the existing subscription. Such repricing may be implemented in order to ensure that a current subscription, while remaining competitive during a period of rising prices, continues to be profitable.

In other cases, a repricing action may be selected in order to more aggressively lower a per-unit cost of an existing subscription to a level that is a predetermined amount or a predetermined percent lower than that of a lowest competing offer, of an average of all competing offers, of one or more competing offers that satisfy a certain criteria related to the duration, start time, or quantity of the offer, or of some other function of one or more competing offers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
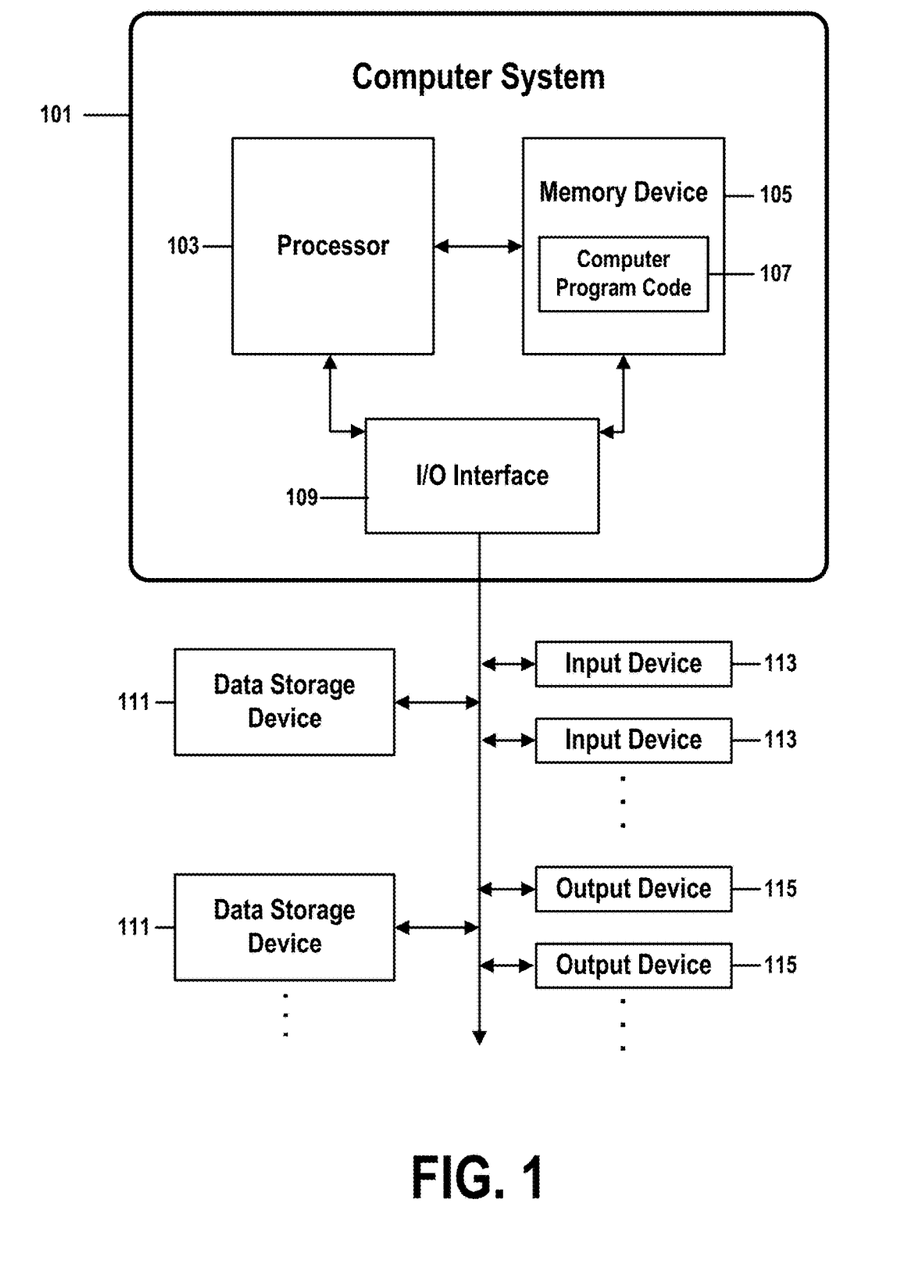
FIG. 1 shows the structure of a computer system and computer program code that may be used to implement a method for dynamic repricing of an online subscription in accordance with embodiments of the present invention.

FIG. 1 shows a structure of a computer system and computer program code that may be used to implement a method for dynamic repricing of an online subscription in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for dynamic repricing of an online subscription in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for dynamic repricing of an online subscription.

Any of the components of the present invention could be created, integrated, hosted, maintained, deployed, managed, serviced, supported, etc. by a service provider who offers to facilitate a method for dynamic repricing of an online subscription. Thus the present invention discloses a process for deploying or integrating computing infrastructure, comprising integrating computer-readable code into the computer system 101, wherein the code in combination with the computer system 101 is capable of performing a method for dynamic repricing of an online subscription.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for dynamic repricing of an online subscription may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for dynamic repricing of an online subscription is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
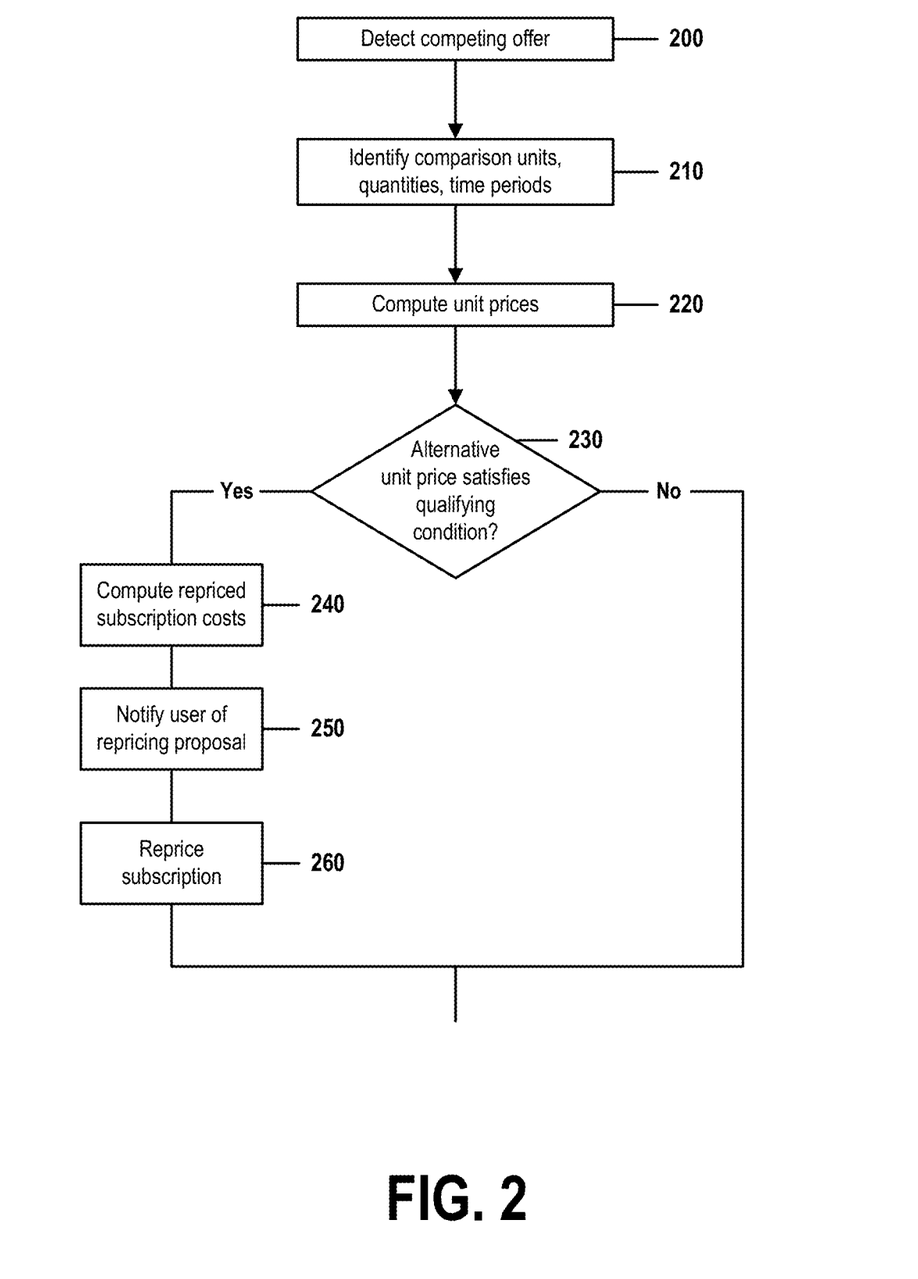
FIG. 2 is a flow chart that illustrates steps of a method for dynamic repricing of an online subscription in accordance with embodiments of the present invention.

FIG. 2 is a flow chart that illustrates steps of a method for dynamic repricing of an online subscription in accordance with embodiments of the present invention. FIG. 2 comprises steps 200-260.

In step 200, a processor of an e-commerce system that is managing an online subscription detects a competing offer. This offer may be proffered by the same online merchant that has offered the current subscription, by an online or bricks-and-mortar competitor of the online merchant, by a manufacturer or other third party, or by any other entity capable of making such an offer to a subscriber of the online subscription.

As described above, the online description provides to a subscribing customer a subscribed quantity of each of one or more subscribed items during each replenishment period of a subscription term. Such an online subscription may, for example, automatically invoice and deliver to a subscribing customer 30 servings of a canned product and 20 servings of a bottled product during each monthly replenishment period of a one-year subscription term.

FIG. 2, for pedagogical reasons, generally describes embodiments in which one subscribed product is compared to one alternative product. This description should not, however, be construed to limit embodiments of the present invention to single-product subscriptions, competing offers, and comparison and repricing functions.

The competing offer may be any sort of offer capable of competing economically with the subscription. It may, for example, be an online or mail-in subscription offer, a limited-duration promotion that offers products at a discounted price, a coupon, an incentive that rewards a buyer with a free gift or with incentive points, a buy-two-get-one-free offer, a rebate offer, a limited-time pre-order price, or a brick-and-mortars holiday-weekend sale.

The competing offer may offer one or more alternative products that may each be identical to one of the subscribed products, equivalent to one of the subscribed products (such as a commodity product sold by a different distributor), or in a same class or product category as that of one of the subscribed products (such as an LED light bulb of the same wattage as that of the subscribed product). In other cases, an alternative product may be merely similar to a subscribed product, where a qualifying degree of similarity is defined by predefined rules. For example, an embodiment may comprise a predefined rule that defines two ground-beef products as being "similar" if both products are at least 70% lean.

If the competing offer and the subscription each comprise more than one product, an embodiment of the present invention may apply a method analogous to that of FIG. 2 to reprice any number of the one or more products. Some embodiments of the present invention may thus apply methods of FIG. 2 to only a subset of the competing offer's alternative products or to only a subset of the subscription's subscribed products.

The present invention is flexible enough to accommodate any desired method of choosing which and how many of the subscribed and alternative products to select for comparison or repricing. In one example, if a subscription provides a weekly assortment of groceries, certain embodiments may compare and reprice only a subset of the subscription's standard assortment to alternative items of a competing offer that may or may not comprise all of the subscribed items. In other embodiments, alternative items may be selected from an aggregation of multiple competing offers that may or may not be offered concurrently.

In step 210, the processor identifies parameters by which a unit cost of an alternative product identified in step 200 may be compared to a unit cost of a corresponding subscribed product and by which the processor may associate a duration of time or a quantity of subscribed product with a repricing action.

The present invention is flexible enough to accommodate any desired parameter-selection guidelines desired by an implementer, so long as the selected parameters allow the processor to compare a unit price of the alternative product to an analogous unit price of the subscribed product, to select a duration of time during which a repricing is effective, or to select a quantity of product to be repriced.

A first such parameter is a common unit of comparison by which quantities of the alternative product and the subscribed product may be compared. Examples of such a unit might be a "serving" of a product, a capsule of a medication, a liquid ounce, a gram of mass, a minute of cell-phone call time, a megabyte of data, or a unit of virtual currency of a video game. The processor may use any known method of choosing a unit, such as by referring to a preloaded table that lists a most common unit associated with a particular product, by adopting an industry-standard "serving" as a unit, or by inferring a best unit through cognitive means, such as by means of artificially intelligent software or a network-traversing software bot or agent.

A second parameter may be a quantity of units to compare and reprice. Again, a value for this quantity parameter may be selected by any means known in the art. For example, if a subscription provides 60 units of a subscribed product during a replenishment period, the processor may simply choose a quantity of 60 units when computing unit prices in step 220 or when repricing the subscription in step 260.

In other cases, the processor may select a quantity that is equivalent to the quantity of units offered by the competing offer. If, for example, a competing offer offers 40 units of an alternative product at a discounted price, the processor might reprice only 40 units of the subscribed product, regardless of the total number of subscribed-product units provided during a replenishment period.

In some embodiments, the processor may also in this step select a time period during which a repricing is effective. As before, a value for this repricing-period parameter may be selected by any means known in the art.

For example, if the processor has determined that 30 units of a subscribed product will be repriced, and if the subscription provides 10 units/week of the subscribed product, then the processor in this step may determine that the subscription should be repriced for the duration of a three-week period of time.

Another embodiment, if desired by an implementer, might instead select a repricing time period that matches the duration or the actual dates of the competing offer. In such cases, if a competing offer is effective during the 30-day month of April, the processor may reprice the subscription during that same month of April, or during any days of April that remain after a repricing determination has been made. In yet another variation, the processor might instead reprice the subscription during some other 30-day period, matching the duration, but not the actual effective dates, of the competing offer.

This flexibility allows embodiments of the present to accommodate numerous types of marketing or sales models. The present invention may, for example, always reprice a subscription to exactly match the quantity of an alternative product offered by a competing offer. But if desired by an implementer, the system may also be programmed with different selection guidelines, and these guidelines may be more complex, even comprising conditional logic. In one example, the processor may, upon determining that a subscriber has only one replenishment period left, offer to extend a repricing discount only if the subscriber agrees to extend the subscription term. In another case, the processor may select a higher or lower repriced unit cost as a function of a user characteristic, such as a purchase history, a credit score, or demographic characteristics.

Similar flexibility may be provided in embodiments that always reprice a subscription to match a duration of time of a competing offer. Other embodiments may compute multiple candidate unit prices and automatically choose the lowest or highest candidate price, or may subsequently adjust or weight selected prices as a function of a user characteristic or as a function of a characteristic of the competing offer.

Embodiments of the present invention that compute more than one candidate unit price may also present more than one candidate total subscription price—each based on one or more of the candidate unit prices—to the subscribing customer in step 250 and allow the customer to select one of the repricing terms.

In step 220, the processor computes, using the parameters derived in step 210, unit prices of one or more subscribed products, under terms of the subscription, and analogous unit prices of one or more alternative products under terms of the competing offer.

In one example, if the subscription provides 10 servings of a subscribed product during every 14-day replenishment period for a $10.00 replenishment fee, the processor might in this step compute a unit price of the subscribed product of $1.00/serving. Similarly, if the competing offer offers 25 servings of an alternative product for $20, the processor might in this step compute a unit price of the alternative product of $0.80/serving.

The processor may consider other factors when computing a unit price. If, for example, the competing offer or the subscription adds 5 free servings of a product to every $10.00 order of 10 servings, then the processor may compute a unit price to be $10/(10+5)=$0.67/serving. And if an offer to sell 10 servings of a product for $10.00 is accompanied by a $5.00 coupon, the processor might compute a unit price of (10.00−$5.00)/10=$0.50/serving.

In some embodiments, unit costs may computed as landed costs that include shipping, handling, sales tax, or other additional fees. If either the subscription unit cost or the competitive unit cost is computed as a landed cost, some embodiments may require all unit costs to be computed as landed costs in order to ensure meaningful cost comparisons.

In step 230, the processor determines whether the competing offer's alternative unit price satisfies one or more qualifying conditions. If so, the method of FIG. 2 continues with steps 240-260. If the unit price does not satisfy the one or more conditions, the method of FIG. 2 ends, restarting with step 200 only when another competing offer is detected.

The qualifying conditions may comprise any condition desired by an implementer. An embodiment may, for example, perform steps 240-260 if the alternative unit price is less than the subscription unit price, if the alternative unit price is less than 80% of the subscription price, or if the alternative unit price differs from the subscription price by more than 10%.

In step 240, the processor selects one or more repriced total subscription prices as a function of the unit prices computed in step 220. This selection may be made by means of any guidelines desired by an implementer. In a simple example, the processor may merely reprice the subscription to match the alternative per-unit price of the competing offer. In another example, the subscription may be repriced to a per-unit price that is a predetermined percent below the per-unit price of the competing offer.

For example, if the competing offer offers 100 servings for $10.00, the processor in this step might select a total repriced subscription cost of a 60 servings/period subscription to be $6.00/period, thereby matching the $0.10/serving unit price of the competing offer. If an implementer's business model calls for the subscription to be priced 10% below the lowest competing offer, then a repriced total subscription cost might instead be $5.40/period.

Other embodiments might follow different repricing guidelines, if desired by an implementer, as a function of whether the alternative unit price is higher than the subscription unit price or lower than the subscription unit price. For example, if the alternative unit price is lower, then the processor might reprice the subscription unit price to a figure that is 10% lower than the alternative unit price. But if the alternative unit price is higher, the processor might reprice the subscription to a unit price that is identical to the higher alternative unit price.

Embodiments of the present invention are flexible enough to accommodate many other repricing guidelines, including those based on a time of year, an element of a subscriber's user profile, a market segment of a subscribed product, or a subscriber's physical location. For example, an embodiment might, upon determining in step 230 that the alternative unit price is lower than the current subscribed unit price, retrieve from the Internet other prices of equivalent products and then reprice the subscription as a function of the highest, lowest, or average of all retrieved unit prices.

The processor in this step may also select repricing terms as a function of a desired quantity of product to be repriced or of a duration of time during which the repricing is to be effective. These parameters may be determined as functions of the values identified in step 210. In some cases, these terms may be selected in order to provide the subscribing customer with the best possible pricing and terms, within any preset constraints.

These factors may result in the determination of several possible candidate repricing terms. For example, if a competing offer offers a lower unit price for 100 servings of a product for a one-month period, this may result in two different possible repricings of a subscription that delivers 50 servings every month. In one case, the processor may reprice the subscription to provide a number of servings equal to that of the competing offer at a reduced price. This would result in repricing the subscription to provide 100 repriced servings over the course of two months. But in another case, the processor might reprice the subscription to provide reduced unit costs for the duration of the competing offer, thus providing 50 repriced servings over the course of one month.

In yet other examples, a subscription that comprises multiple subscribed products may be repriced as a function of comparisons of unit costs of only a subset of the multiple subscribed products. For example, if a subscription provides periodic supplies of three products, a competing offer may comprise an offer to sell only two of those three products at unit costs different from the unit costs of analogous subscribed products. Here, the entire subscription may be repriced as a function of a pricing adjustment of only the two products. In such embodiments, guidelines may determine whether the entire subscription should be repriced based on whether the repriced unit costs of the two products result in the total cost of the repriced subscription becoming higher or lower. For example, if the processor, as a result of comparing the alternative unit costs of the two products determines that a unit cost of a first subscribed product should rise 20% and a unit cost of a second subscribed product should drop 15%, then repricing the subscription cost might result in either a higher total subscription cost or a lower total subscription cost. Here, an embodiment might, as a function of an implementer's marketing strategy, implement different repricing strategies as a function of whether the repricing results in a higher or a lower total subscription cost.

When multiple possible repricing methods exist, the processor may select the computed unit cost that most closely satisfies a predetermined guideline—such as a guideline to choose the lowest unit cost or the most profitable total subscription price that is no more than 10% higher than the lowest competitor's price—or may allow a user to select a particular repricing option in step 250.

In step 250, the processor may optionally display to the subscriber one or more repricing options computed in step 240. The processor may in this step request authorization from the user to effect the actual repricing or may ask the subscriber to select a particular repricing option from multiple displayed options. The subscriber may also be allowed to associate a repricing option with a user-selected quantity or with a user-selected effective period of time.

The processor may also, if desired by an implementer, display information about how a particular candidate repricing option was computed, may identify the competing offer or offers, or may display information about other terms of each repricing option, such as unit pricing, a total number of units subject to repricing, or a period of time during which each candidate repricing option would be effective.

In certain embodiments, this step will be purely informational and the subscriber will not be required to authorize or select an option. In such cases, as well as in cases where step 250 is not performed at all, the processor will continue to step 260 and automatically implement a selected repricing option.

In step 260, the method of FIG. 2 concludes with the processor directing the e-commerce system to reprice the subscription. The processor may direct the e-commerce system to reprice the subscription immediately, thereby possibly triggering a credit, refund, or additional billing to the subscriber, or may direct the e-commerce system to reprice the subscription at a future time, such as a future effective date of the competing offer, at the start of the subscription's next replenishment period, or at the time of the next replenishment billing.

Embodiments, figures, and examples of the present invention described in this document have been presented for illustrative purposes, in order to provide an understanding of one or more embodiments of the present invention, including an embodiment that comprises a best presently contemplated mode of practicing the invention.

These embodiments, figures, and examples should not be construed to be exhaustive nor to limit embodiments of the present invention to those described here, and are made solely for the purpose of illustrating general principles of the invention. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A method for providing a dynamically priced online subscription, the method comprising:
   identifying, by a processor of a pricing component of a computerized e-commerce system, an alternative offering that offers to sell an alternative quantity of a subscribed item,
   where an online merchant is currently providing the subscribed item to a subscriber by means of an online subscription managed by the e-commerce system,
   where the online subscription provides to the subscriber a subscribed quantity of the subscribed item, at a current subscription unit price, during each subscription replenishment period comprised by a subscription term, and
   where the alternative offering offers to provide an alternative quantity of the subscribed item at an alternative unit price during an alternative time span;
   selecting, by the processor, an updated unit price of the subscribed item as a function of the alternative unit price;
   setting, by the processor, a subscription-reorder price of the online subscription during a reorder term of the online subscription as a function of the updated unit price;
   notifying the subscriber, by the processor:
      that terms of the online subscription have been automatically adjusted as a function of a competing offer, and
      that the automatic adjustment comprises providing the subscription to the subscriber during the reorder term at the subscription-reorder price; and
   automatically directing, by the processor, downstream components of the computerized e-commerce system to provide future performance of the online subscription in accordance with the automatically adjusted terms.

2. The method of claim 1, where the subscription unit price and the alternative unit price are each a landed cost that includes shipping costs.

3. The method of claim 1, where the subscribed quantity is not equal to the alternative quantity.

4. The method of claim 1, where the subscription replenishment period is distinct from the alternative time span.

5. The method of claim 1, where the alternative offering is offered by a party that is distinct from the online merchant.

6. The method of claim 1 where the selecting an updated unit price further comprises:
   adjusting, by the processor, a number of units to be sold at the reorder unit price as a function of the alternative quantity and of the alternative unit price.

7. The method of claim 1, where the subscription-reorder price purchases a reorder quantity of the subscribed item, during a duration of time equal to each subscription replenishment period of the online subscription, that is greater than the subscribed quantity.

8. The method of claim 1, where the comparing and the selecting compensate for a difference between the subscribed quantity the alternative quantity.

9. The method of claim 1, further comprising:
   repeating, by the processor, the identifying, the comparing, the selecting, and the setting whenever a competing offering for the subscribed item is offered by an online seller.

10. The method of claim 1 where the subscription-reorder price becomes effective as a function of a start time of the alternative e span.

11. The method of claim 1, here the setting is performed automatically without requiring manual confirmation from the subscriber.

12. The method of claim 1, where the alternative offering is an alternative subscription and where the alternative time span is an alternative replenishment period comprised by an alternative term of the alternative subscription.

13. The method of claim 1, where a unit price of the subscribed item identifies a price per serving of the subscribed item.

14. The method of claim 1, where the online subscription comprises a second item, and where the subscription-reorder price is lower than a total price for the online subscription during a previous subscription replenishment period.

15. A computer program product, comprising a non-transitory computer-readable hardware storage medium having a computer-readable program code stored therein, said program code configured to be executed by a processor of a pricing component of a computerized e-commerce subscription system to implement a method for providing a dynamically priced online subscription, the method comprising:

identifying, by the processor, an alternative offering that offers to sell an alternative quantity of a subscribed item,
where an online merchant is currently providing the subscribed item to a subscriber by means of an online subscription managed by the e-commerce system,
where the online subscription provides to the subscriber a subscribed quantity of the subscribed item, at a current subscription unit price, during each subscription replenishment period comprised by a subscription term, and
where the alternative offering offers to provide an alternative quantity of the subscribed item at an alternative unit price during an alternative time span;
selecting, by the processor, an updated unit price of the subscribed item as a function of the alternative unit price;
setting, by the processor, a subscription-reorder price of the online subscription during a reorder term of the online subscription as a function of the updated unit price;
notifying the subscriber, by the processor:
that terms of the online subscription have been automatically adjusted as a function of a competing offer, and
that the automatic adjustment comprises providing the subscription to the subscriber during the reorder term at the subscription-reorder price; and
automatically directing, by the processor, downstream components of the computerized e-commerce system to provide future performance of the online subscription in accordance with the automatically adjusted terms.

16. The computer program product of claim 15, where the selecting an updated unit price further comprises:
adjusting, by the processor, a number of units to be sold at the reorder unit price as a function of the alternative quantity and of the alternative unit price.

17. The computer program product of claim 15, where the subscription-reorder price purchases a reorder quantity of the subscribed item, during a duration of time equal to each subscription replenishment period of the online subscription, that is greater than the subscribed quantity.

18. A pricing component of a computerized e-commerce subscription system comprising a processor, a memory coupled to the processor, and a computer-readable hardware storage device coupled to the processor, the storage device containing program code configured to be run by the processor via the memory to implement a method for providing a dynamically priced online subscription, the method comprising:

identifying, by the processor, an alternative offering that offers to sell an alternative quantity of a subscribed item,
where an online merchant is currently providing the subscribed item to a subscriber by means of an online subscription managed by the e-commerce system,
where the online subscription provides to the subscriber a subscribed quantity of the subscribed item, at a current subscription unit price, during each subscription replenishment period comprised by a subscription term, and
where the alternative offering offers to provide an alternative quantity of the subscribed item at an alternative unit price during an alternative time span;
selecting, by the processor, an updated unit price of the subscribed item as a function of the alternative unit price;
setting, by the processor, a subscription-reorder price of the online subscription during a reorder term of the online subscription as a function of the updated unit price;
notifying the subscriber, by the processor:
that terms of the online subscription have been automatically adjusted as a function of a competing offer, and
that the automatic adjustment comprises providing the subscription to the subscriber during the reorder term at the subscription-reorder price; and
automatically directing, b the processor, downstream components of the computerized e-commerce system to provide future performance of the online subscription in accordance with the automatically adjusted terms.

19. The computer system of claim 18 where the selecting an updated unit price further comprises:
adjusting, by the processor, a number of units to be sold at the reorder unit price as a function of the alternative quantity and of the alternative unit price.

20. The computer system of claim 18, where the subscription-reorder price purchases a reorder quantity of the subscribed item, during a duration of time equal to each subscription replenishment period of the online subscription, that is greater than the subscribed quantity.

21. The method of claim 1, where the reorder term is the remaining portion of the current subscription term.

* * * * *